(12) United States Patent
Azam et al.

(10) Patent No.: US 11,079,799 B2
(45) Date of Patent: Aug. 3, 2021

(54) MATEABLE COMPUTING DEVICES

(71) Applicant: HEWLETT-PACKARD DEVELOPMENT COMPANY, L.P., Houston, TX (US)

(72) Inventors: Syed S. Azam, Houston, TX (US); Xiang Ma, Houston, TX (US); Manjunath Bhat, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 158 days.

(21) Appl. No.: 16/097,470

(22) PCT Filed: May 4, 2016

(86) PCT No.: PCT/US2016/030792
§ 371 (c)(1),
(2) Date: Oct. 29, 2018

(87) PCT Pub. No.: WO2017/192135
PCT Pub. Date: Nov. 9, 2017

(65) Prior Publication Data
US 2019/0146553 A1 May 16, 2019

(51) Int. Cl.
*G06F 1/16* (2006.01)
*G06F 1/26* (2006.01)
(Continued)

(52) U.S. Cl.
CPC .......... *G06F 1/1632* (2013.01); *G06F 1/1616* (2013.01); *G06F 1/1637* (2013.01);
(Continued)

(58) Field of Classification Search
CPC .... G06F 1/1632; G06F 1/1616; G06F 1/1637; G06F 1/1654; G06F 1/1662;
(Continued)

(56) References Cited

U.S. PATENT DOCUMENTS

| 6,453,378 | B1 * | 9/2002 | Olson | G06F 1/1632 361/679.41 |
| 7,683,573 | B2 * | 3/2010 | Nikazm | G06F 1/263 320/113 |

(Continued)

FOREIGN PATENT DOCUMENTS

| EP | 2306263 | 4/2011 |
| WO | WO-2010110954 | 9/2010 |
| WO | WO-2011107871 A2 | 9/2011 |

OTHER PUBLICATIONS

Ackerman, Dan, "Intel Compute Stick (2016) review: A second-gen computer-on-a-stick gets bigger, but better," clnet, Jan. 24, 2016.
(Continued)

*Primary Examiner* — Aurel Prifti
(74) *Attorney, Agent, or Firm* — HP Inc. Patent Department

(57) ABSTRACT

An example computing device includes a connector. The connector is to mate with a display unit. The connector is to receive power from the display unit and output a display signal to the display unit. The computing device includes a non-transitory computer readable medium. The computing device also includes a processor communicatively coupled to the non-transitory computer readable medium. The processor is to determine a form factor of the display unit. The processor also is to adjust at least one of a resolution and an orientation of an image to be included in the display signal based on the form factor.

14 Claims, 10 Drawing Sheets

(51) Int. Cl.
| | |
|---|---|
| G06F 1/324 | (2019.01) |
| H04M 1/04 | (2006.01) |
| H04M 1/72409 | (2021.01) |
| G06F 1/18 | (2006.01) |
| G06F 1/20 | (2006.01) |
| G06F 1/3218 | (2019.01) |
| G06F 1/3234 | (2019.01) |
| H04M 1/02 | (2006.01) |

(52) U.S. Cl.
CPC .......... *G06F 1/1654* (2013.01); *G06F 1/1662* (2013.01); *G06F 1/1681* (2013.01); *G06F 1/189* (2013.01); *G06F 1/20* (2013.01); *G06F 1/266* (2013.01); *G06F 1/324* (2013.01); *G06F 1/3218* (2013.01); *G06F 1/3234* (2013.01); *H04M 1/04* (2013.01); *H04M 1/72409* (2021.01); *H04M 1/0249* (2013.01); *H04M 1/0266* (2013.01); *H04M 1/0274* (2013.01); *H04M 2250/16* (2013.01)

(58) Field of Classification Search
CPC .......... G06F 1/1681; G06F 1/189; G06F 1/20; G06F 1/266; G06F 1/3218; G06F 1/3234; G06F 1/324; H04M 1/04; H04M 1/72527; H04M 1/0249; H04M 1/0266; H04M 1/0274; H04M 2250/16
See application file for complete search history.

(56) References Cited

U.S. PATENT DOCUMENTS

| | | | | |
|---|---|---|---|---|
| 7,916,467 | B2 * | 3/2011 | Hotelling | G06F 1/1632 320/108 |
| 8,072,392 | B2 * | 12/2011 | Lection | G06F 1/1632 345/1.1 |
| 8,903,517 | B2 * | 12/2014 | Perek | G06F 3/02 700/66 |
| 9,420,329 | B2 * | 8/2016 | Majid | H04N 21/4263 |
| 2004/0150944 | A1 * | 8/2004 | Byrne | H02J 7/0003 348/207.99 |
| 2005/0010708 | A1 * | 1/2005 | Haley | G06F 1/1616 710/303 |
| 2006/0172112 | A1 * | 8/2006 | Fujimaki | F16D 13/64 428/98 |
| 2006/0222055 | A1 * | 10/2006 | Khodorkovsky | H01R 13/7038 375/142 |
| 2006/0238497 | A1 | 10/2006 | Velagapudi | |
| 2008/0140886 | A1 * | 6/2008 | Izutsu | H04M 1/0266 710/69 |
| 2009/0023475 | A1 * | 1/2009 | Chang | H04M 1/72527 455/557 |
| 2010/0060549 | A1 * | 3/2010 | Tsern | G06F 3/1454 345/2.1 |
| 2010/0146308 | A1 * | 6/2010 | Gioscia | H02J 5/005 713/300 |
| 2010/0244765 | A1 * | 9/2010 | Collopy | G06F 1/169 320/103 |
| 2010/0250794 | A1 | 9/2010 | Hanks et al. | |
| 2010/0250816 | A1 * | 9/2010 | Collopy | G06F 1/1616 710/303 |
| 2011/0032018 | A1 * | 2/2011 | Afaneh | G06F 1/266 327/322 |
| 2011/0153881 | A1 | 6/2011 | Ace | |
| 2011/0191480 | A1 * | 8/2011 | Kobayashi | H04N 21/43632 709/227 |
| 2011/0216495 | A1 * | 9/2011 | Marx | H05K 5/02 361/679.22 |
| 2012/0062370 | A1 | 3/2012 | Feldstein et al. | |
| 2012/0137038 | A1 * | 5/2012 | Huang | G06F 1/1632 710/303 |
| 2012/0169933 | A1 * | 7/2012 | Lee | H04N 5/765 348/563 |
| 2012/0170204 | A1 * | 7/2012 | Ahn | G06F 1/1616 361/679.41 |
| 2012/0192265 | A1 | 7/2012 | Arnouse | |
| 2012/0274656 | A1 * | 11/2012 | Kang | G06F 1/1632 345/619 |
| 2012/0287343 | A1 * | 11/2012 | Kelly | G06F 3/1438 348/554 |
| 2012/0321057 | A1 * | 12/2012 | Goodman | H04M 1/2757 379/90.01 |
| 2013/0010418 | A1 | 1/2013 | Flynn et al. | |
| 2013/0021439 | A1 * | 1/2013 | Tao | H04N 21/816 348/43 |
| 2013/0057774 | A1 * | 3/2013 | Yoshida | H04N 21/42202 348/725 |
| 2013/0155126 | A1 * | 6/2013 | Lathrop | G06F 11/3058 345/690 |
| 2013/0162515 | A1 * | 6/2013 | Prociw | G06F 1/1616 345/156 |
| 2013/0319640 | A1 | 12/2013 | Cavallaro et al. | |
| 2014/0075075 | A1 * | 3/2014 | Morrill | G06F 1/1632 710/303 |
| 2014/0075377 | A1 * | 3/2014 | Kang | H04M 1/72527 715/788 |
| 2014/0108832 | A1 * | 4/2014 | Yamaguchi | G06F 1/1616 713/320 |
| 2014/0129738 | A1 * | 5/2014 | Hussain | G06F 1/1632 710/8 |
| 2014/0164962 | A1 | 6/2014 | Zurmuehl | |
| 2014/0191909 | A1 * | 7/2014 | Tinaphong | H01Q 1/2291 343/702 |
| 2014/0245029 | A1 * | 8/2014 | Jain | G06F 1/26 713/300 |
| 2014/0351477 | A1 * | 11/2014 | Lee | H04L 61/2528 710/303 |
| 2015/0234770 | A1 * | 8/2015 | Koyanagi | H04L 43/0817 710/302 |
| 2015/0249562 | A1 * | 9/2015 | Zhang | H04B 1/06 375/260 |
| 2015/0326659 | A1 | 11/2015 | Cheng et al. | |
| 2015/0331463 | A1 * | 11/2015 | Obie | G06F 1/266 713/300 |
| 2015/0373483 | A1 * | 12/2015 | Verma | H04W 4/80 455/41.3 |
| 2016/0062544 | A1 * | 3/2016 | Matsuda | G06F 3/0416 345/173 |
| 2016/0085280 | A1 * | 3/2016 | Harel | G06F 1/266 710/14 |
| 2016/0091925 | A1 * | 3/2016 | Ardisana, II | G06F 1/1632 361/679.43 |
| 2016/0124569 | A1 * | 5/2016 | Sunwoo | G06F 3/1438 345/173 |
| 2016/0126757 | A1 * | 5/2016 | Hirosawa | G06F 3/0202 307/20 |
| 2016/0147292 | A1 * | 5/2016 | Sunwoo | G06F 1/3215 713/323 |
| 2016/0150471 | A1 * | 5/2016 | Tan | H04W 52/0209 455/574 |
| 2016/0190840 | A1 * | 6/2016 | Rich | H02J 7/00036 320/106 |
| 2016/0202748 | A1 * | 7/2016 | Lin | G06F 1/1632 713/323 |
| 2016/0239943 | A1 * | 8/2016 | de Moraes | G06F 1/1637 |
| 2016/0259395 | A1 * | 9/2016 | Kato | G09G 3/001 |
| 2016/0277790 | A1 * | 9/2016 | Nakajima | H04N 21/43637 |
| 2017/0037447 | A1 * | 2/2017 | Chandrapati | C12Q 1/22 |
| 2017/0064389 | A1 * | 3/2017 | Teramoto | H04N 21/8586 |
| 2017/0102676 | A1 * | 4/2017 | Park | G06F 1/1616 |
| 2017/0177069 | A1 * | 6/2017 | Bedare | G06F 1/263 |
| 2017/0227989 | A1 * | 8/2017 | Ent | G06F 1/1601 |
| 2017/0269664 | A1 * | 9/2017 | Garner | H04N 21/4882 |
| 2018/0014075 | A1 * | 1/2018 | Lewis | H04N 21/43635 |
| 2018/0107246 | A1 * | 4/2018 | Dees | H04B 7/26 |
| 2019/0018443 | A1 * | 1/2019 | Ogiwara | H04N 21/2662 |

(56) References Cited

OTHER PUBLICATIONS

Anderson, Tim, "Return of the Pocket PC: Acer shows off Jade Primo PC Phone," The Register, Sep. 2, 2015.
Brown, Eric, "Google's Project Ara Open Source Smartphone to Debut in Puerto Rico This Year," Linux.com, Jan. 29, 2015.
Giles, N.A., "The New Apple MacBook's Only Port: USB Type-C Explained", Mar. 9, 2015.
Greenwald, Will, "Fire TV Stick vs. Chromecast vs. Roku Stick: Media Streamers Compared," PC Magazine, Nov. 22, 2014.
Hachman, Mark, "ICE turns to the crowd to fund its xPC modular computer," PCWorld, Jan. 15, 2014.
Hachman, Mark, "The Hive's Arnplicity is a modular, smartphone-sized PC with a graphics card dock," PCWorld, Jan. 7, 2015.
Lee, K, "Lenovo's New Computer Stick Turns any Screen into a PC".
McNicoll, Arion, "Phonebloks: The smartphone for the rest of your life," CNN, Sep. 19, 2013.
Portnoy, S. "Archos $99 PC Stick is Latest Windows Computer that Fits in Your Pocket", Jun. 25, 2015.
Velazco, Chris, "ASUS Padfone X review: A phone to replace your tablet? Not quite," Engadget, Jun. 19, 2014.

\* cited by examiner

US 11,079,799 B2

MATEABLE COMPUTING DEVICES

BACKGROUND

A computing device may include a processor communicatively coupled to a non-transitory computer readable medium. The non-transitory computer readable medium may include instructions that can be executed by the processor. The computing device may include input and output components, such as a keyboard, a mouse or touchpad, a touch screen, a display, a speaker, or the like. The computing device may include a port to communicate with a peripheral device, a network interface to communicate with a wired or wireless network, or the like. The computing device may receive power from a battery, from a wired connection, or the like.

DETAILED DESCRIPTION

The above-described computing device may include several drawbacks. The computing device may be difficult to upgrade. For example, the computing device may be a notebook, tablet, or phone, and the manufacturer may not sell upgrades to individual components in the computing device. Rather, users may need to upgrade the entire computing device. Similarly, a business may include users that have varying needs for computing devices, and the business may need to obtain different devices for different users or user one-size-fits-all approach that fails to satisfy the needs of all users or is more expensive than need be. In addition, a user may want several computing devices, such as a phone and a notebook, but it may be expensive to provide each user with multiple devices. The user may also have difficulty transferring files, applications, and processor tasks between devices.

A compute stick or a device coupleable to an adapter or docking station may provide users with a lightweight way to connect to various display devices. However, compute sticks may need a separate power source in addition to the interface used to connect to the display device. Compute sticks and coupleable devices may also stick out obtrusively when coupled to a display device. The compute sticks, coupleable devices, or their power sources may be bumped and dislodged by users during operation, which may cause the compute stick or coupleable device to lose power and turn off. Thus, compute sticks and coupleable devices may be unaesthetic and may have usability problems.

Compute sticks and coupleable device also may include processors without much compute power. Thus, the compute sticks and coupleable devices may be inadequate for intensive desktop or workstation computing. Moreover, compute sticks and coupleable devices may not include interfaces that can couple with a large variety of display devices (e.g., phones, tablets, notebooks, docking stations, desktops, workstations etc.). Accordingly, there may be few uses for compute sticks and limited versatility. In addition, compute sticks and coupleable devices may not adjust the user interface or display settings based on the display device to which they are connected. Thus, the compute sticks and coupleable devices may have limited uses or may have poor usability with some display devices.

Figure 1:
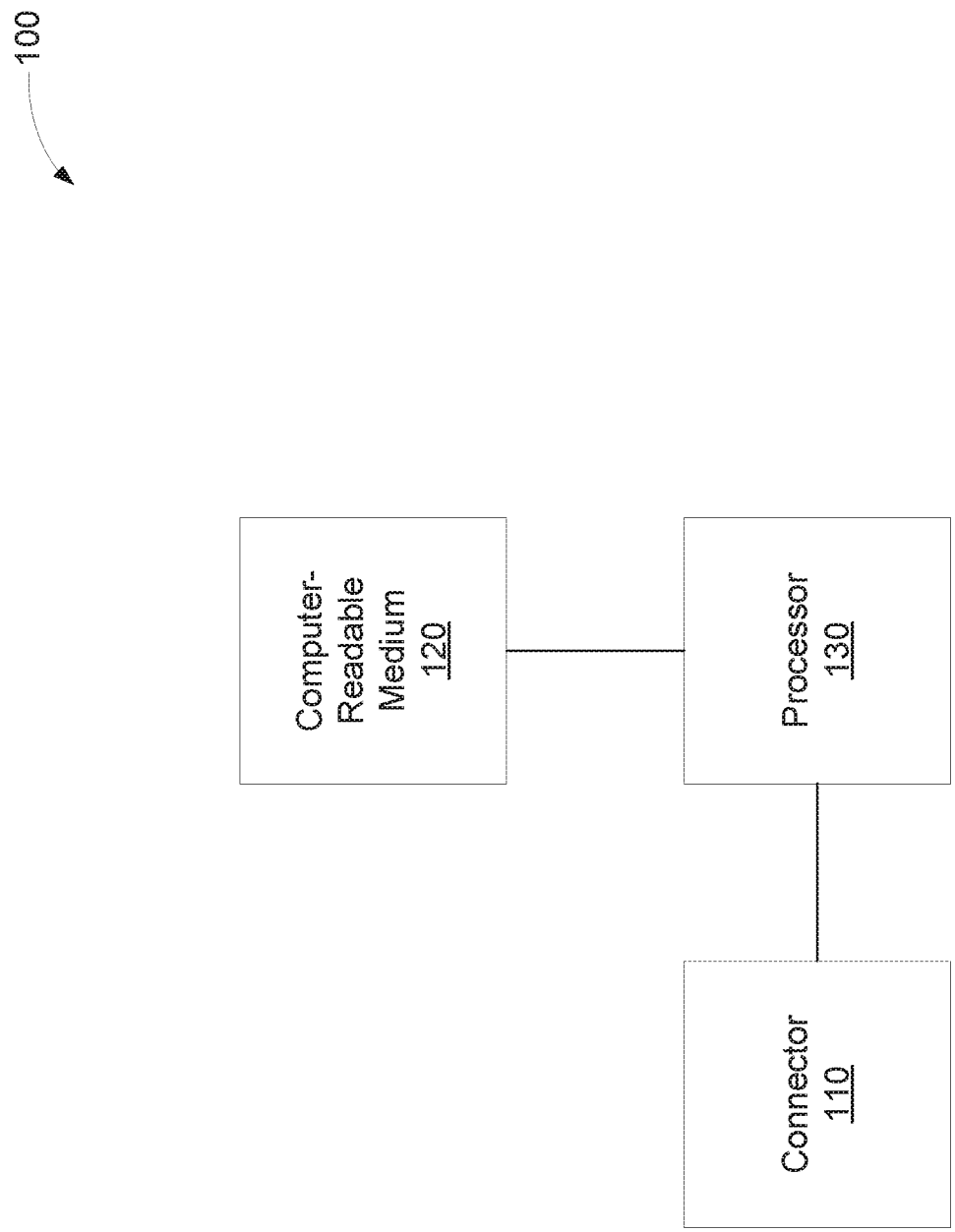
FIG. 1 is a block diagram of an example computing device to couple with various form factors.

FIG. 1 is a block diagram of an example computing device 100 to couple with various form factors. The computing device 100 may include a connector 110. The connector 110 may mate with various form factors of display units. As used herein, the term "form factor" refers to a device with a particular set of components having a particular arrangement and configuration. The term "display unit" refers to a device that includes a display to present an image to a user. The display units may include additional input or output components (e.g., speakers, keyboard, mouse or touchpad, touch screen, etc.), ports, wireless or wired network interfaces, sensors, a battery, a power supply, or the like. In some examples, the display units may not include a processor, random access memory (RAM), a persistent storage device, or the like. In some examples, the display units may not include a battery, network interfaces, sensors, or the like.

The connector 110 may receive power from a display unit and output a display signal to the display unit. The connector 110 may include power lines to receive the power from the display unit. In some examples, the connector 110 may deliver power to display units without power sources. The connector 110 may include data lines to output the display signal to the display unit. For example, the data lines may be high-speed data lines. The connector 110 may also receive data from the display unit, such as data from user interface components, ports, network interfaces, sensors, or the like.

The computing device 100 may also include a computer-readable medium 120. The computer-readable medium 120 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), or the like. The computing device 100 may also include a processor 130. The processor 130 may be communicatively coupled to the non-transitory computer readable medium 120. The processor 502 may be a general purpose processor or special purpose logic, such as a microprocessor, a digital signal processor, a microcontroller, an application specific integrated circuit (ASIC), a field programmable gate array (FPGA), a programmable array logic (PAL), a programmable logic array (PLA), a programmable logic device (PLD), etc. In some examples, the display unit may not include a processor, main memory, or a storage device, so the processor 130 and computer-readable medium 120 may provide processing, memory, and storage capabilities to the display unit.

In addition, the processor 130 may determine the form factor of the display unit. For example, the processor 130 may retrieve an identifier indicative of the form factor, retrieve form factor information, or the like. The processor 130 may also adjust at least one of a resolution and an orientation of an image to be included in the display signal output by the connector. The processor 130 may adjust the resolution or the orientation based on the determined form factor. For example, a smart phone or tablet may have an aspect ratio, pixel count, or orientation different from that of a notebook. Accordingly, the processor 130 may select the resolution best suited to the determined form factor.

Figure 2:
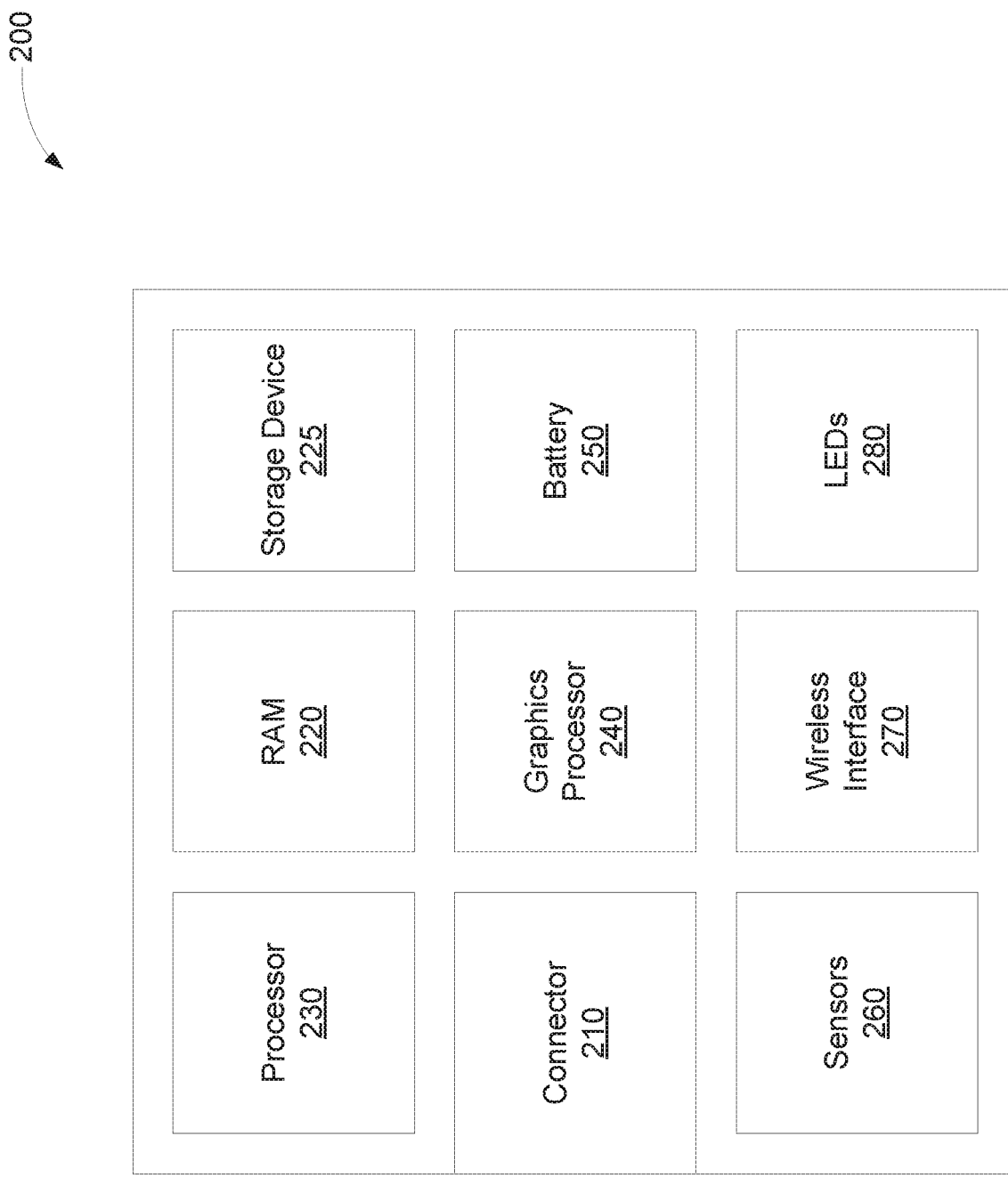
FIG. 2 is a block diagram of another example computing device to couple with various form factors.

FIG. 2 is a block diagram of another example computing device 200 to couple with various form factors. The computing device 200 may include a connector 210 to mate with a display unit. The connector 210 may receive power from the display unit and transmit data to or receive data from the display unit (e.g., a display signal, user input data, network data, etc.). The connector 210 may include or consist of a USB connector (e.g., a type A connector, a type B connector, a type C connector, etc.), a Thunderbolt connector, an RJ45 connector, a pogo connector, a custom connector capable of passing through high speed signals, or the like. In some examples, the connector may couple directly to the display unit without a cable. For example, the connector 210 may have a sex opposite that of a connector in the display unit.

The computing device 200 may also include computer-readable media, such as RAM 220 and a storage device 225. In the illustrated example, the RAM 220 is separate from the storage device 225. In other examples, the computing device 200 may include nonvolatile RAM that rather than both the RAM 220 and the storage device 225. The computing device 200 may include processors, such as a processor 230 (e.g., a central processing unit, etc.), a graphics processor 240, a chipset (e.g., a Northbridge, a Southbridge, etc.), or the like. The processors 230, 240 may communicate with the display unit via the connector 210. For example, the graphics processor 240 may generate the display signal transmitted by the connector 210 to the display unit, and the connector 210 may provide input from user interface components in the display unit to the processor 230.

The processor 230 may determine a form factor of the display unit. In an example, the processor 230 or the connector 210 may detect mating with the display unit and may request the form factor of the display unit. The connector 210 may receive an indication of the form factor and provide the indication to the processor. The indication of the form factor may include a digital or analog identifier (e.g., an identification number, a measurable resistor value, etc.); indications of form factor details (e.g., the components, capabilities, component arrangement, component configuration, etc.); or the like. If the processor 230 receives an identifier, the processor 230 may access an association between identifiers and form factor details to determine how to configure the computing device 200 for the form factor.

The processor 230 may adjust at least one of a resolution and an orientation of an image to be included in the display signal. The processor 230 may adjust the resolution or orientation based on the form factor of the display unit, an orientation sensor (e.g., an orientation sensor in the computing device, an orientation sensor in the form factor, etc.); or the like. The processor 230 may dynamically adjust the resolution or orientation when connected to or disconnected from the display unit while the processor 230 is operating (e.g., not sleeping or off). The processor 230 may adjust the resolution by adjusting a total number of pixels, adjusting an aspect ratio; or the like. The processor 230 may determine an optimal resolution based on the form factor and adjust the resolution to the optimal resolution. The processor 230 may adjust the orientation by determining whether the display unit supports multiple orientations or a single orientation. If the display unit supports multiple orientations, the processor 230 may determine the orientation based on an orientation sensors measurement of the orientation of the computing device or display unit, a user indication of preferred orientation, or the like. Otherwise, the processor 230 may select the single orientation as the orientation.

The processor 230 may adjust a configuration of a graphical user interface (GUI) based on the form factor of the display unit. For example, the processor 230 may cause the GUI to include larger icons, larger text, larger windows or a single window at a time, etc. based on the display unit having a small screen (e.g., a phone, tablet, etc.), the display unit having a high pixel density (e.g., a large number of pixels per inch), or the like. In an example, the processor 230 may cause more or fewer icons, more or less text, or the like to appear on the screen based on the form factor. If fewer icons or less text is displayed, the processor 230 may allow a user to scroll to view the hidden content. The processor 230 may adjust how user input interacts with the GUI based on the form factor of the display unit. For example, the processor 230 may accept different input, display different user interface elements, etc. based on the form factor. The processor 230 may accept multi-touch inputs, display virtual keyboards, etc. for a phone or tablet form factor, and the processor 230 may not display the virtual keyboard for a notebook form factor and may accept keyboard shortcuts rather than multi-touch inputs.

In some examples, the processor 230 may adjust a power profile of the processor 230, the graphics processor 240, or the like based on the form factor. For example, the available power, cooling capabilities, etc. may vary between form factors. A phone display unit may have less available power and less cooling capability than a notebook display unit. For example, the former may not include a cooling fan, but the latter may include one. The processor 230 may determine the amount of power available, the cooling capabilities, etc, based on the form factor. In some examples, the display unit may also, or instead, indicate to the processor 230 whether power is supplied from a battery, wall power, or the like. The display unit may indicate a charge level of the battery to the processor 230. The processor 230 may adjust the power profile based on the available power to reduce performance and limit power usage when less power is available and to provide better performance when more power is available. Alternatively, or in addition, the processor 230 may adjust the power profile based on cooling capabilities to reduce a thermal envelope when cooling capability is limited and to provide better performance when there is more cooling capability. The processor 230 may adjust the power profile by adjusting a processor speed, adjusting the number of cores used, or the like.

The computing device 200 may include a battery 250 to provide power to the computing device 200. Accordingly, the computing device 200 may be able to continue to operate when disconnected from the display unit. In some examples, the processor 230 may detect disconnection from the display unit and may reduce power usage based on the disconnection. For example, the processor 230 may reduce performance to limit power usage. Alternatively, or in addition, the processor 230 may enter a low power state (e.g., an Advanced Configuration and Power Interface state of S1-S4, etc.) based on the disconnection. In an example, the user may indicate (e.g., through settings) what actions should be taken when disconnection is detected. The processor 230 may evaluate a power state of the battery 250 when determining what actions should be taken.

In some examples, the battery 250 may supply power to the computing device 200 while the computing device 200 is connected to a display unit. Alternatively, the battery 250 may supply power to the computing device 200 only when the computing device 200 is not connected to a display unit. The battery 250 may be charged using the power received by the connector 210 when mated with the display unit. In some examples, the processor 230 may determine whether to charge the battery 250 or how much to charge the battery 250 based on a charge state of the battery 250, a power source of the display unit, a charge state of a display unit battery, or the like. For example, the battery 250 may be charged when the display unit is receiving wall power, but charging may be limited or prevented if the battery 250 is partially charged, the display unit has a small battery, the display unit battery has limited charge remaining, or the like.

The computing device 200 may include sensors 260. For example, the sensors 260 may include an orientation sensor, a location sensor (e.g., satellite navigation system sensor, etc.), an inertial measurement unit (e.g., an accelerometer, a gyroscope, etc.), a pressure sensor, a temperature sensor, a light sensor, or the like. In an example, a gyroscope or accelerometer may be used as an orientation sensor. The processor 230 may determine whether to use the sensors 260, sensors from the display unit, both (e.g., distinct sensors from each, redundant sensors from each, etc.), or the like. The processor 230 may determine the available sensors in the display unit based on the indication of the form factor. In some examples, the processor 230 may determine accuracy, precision, power consumption, type, etc. of the sensors in the display unit based on the indication of the form factor. The processor 230 may determine whether to use the sensors 260 or the display unit sensors based on which is more accurate or precise, which consumers more power, whether accuracy can be improved by using both a local and a remote sensor, or the like.

The computing device 200 may include a wireless interface 270. The wireless interface 270 may be able to communicate with a remote device using, for example, Wi-Fi, Bluetooth, a cellular protocol, or the like. The wireless interface 270 may communicatively couple the computing device 200 to a network, such as the Internet. Alternatively, or in addition, the wireless interface 270 may communicatively couple with a peripheral or another display unit. For example, the connector 210 may be mated with a notebook display unit, and the wireless interface 270 may be communicatively coupled with a phone display unit, e.g., to use a microphone and speaker of the phone display unit as a user interface for a phone call. The processor 230 may determine whether to use the wireless interface 270, wireless or wired interfaces of the display unit, both, or the like based on the indication of the form factor. The computing device 200 may include light-emitting diodes (LEDs) 280 to indicate, for example, a state of the device (e.g., on, sleep, off, etc.), storage device accesses, a battery state (e.g., charging, providing power, charging needed, etc.), or the like. The processor 230 may determine whether to use the LEDs 280, LEDs on the display unit, both, or the like based on the indication of the form factor.

In some examples, the computing device 200 may not include a display. The computing device 200 may also lack user interfaces, such as speakers, a keyboard, a mouse or touchpad, a touch screen, or the like. In an example, the computing device 200 may include the single connector 210 for power and data but may not include any other connectors, ports, or wired interfaces. In some examples, the computing device 200 may not include the battery 250, the sensors 260, the wireless interface 270, or the LEDs 280. Rather, the display unit may include a power source, sensors, wireless interface, LEDs, or the like. In some examples, the display unit may include an optical drive, a memory card reader, or the like, and the computing device 200 may or may not include an optical drive, memory card reader, etc.

Figure 3:
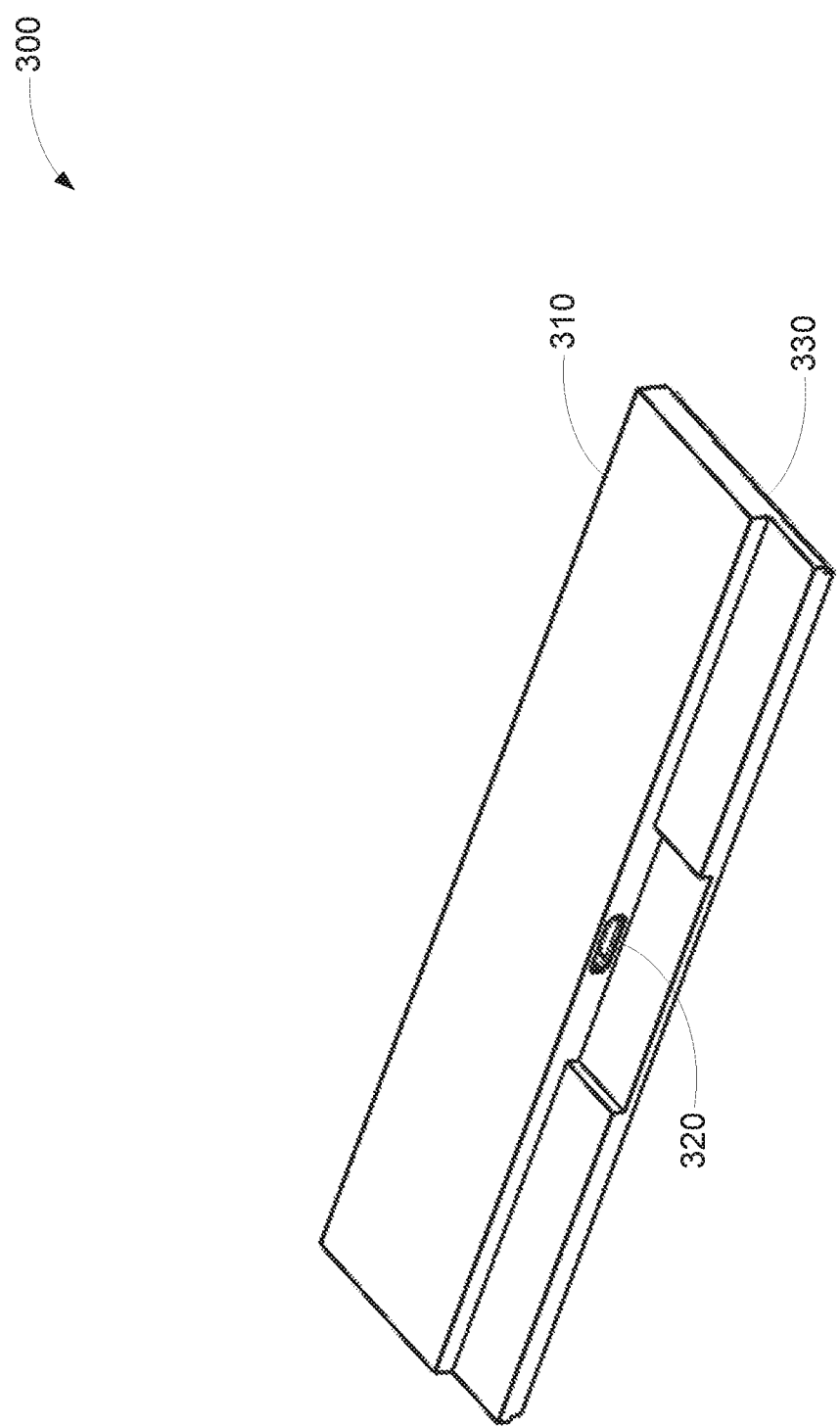
FIG. 3 is a perspective view of still another example computing device to couple with various form factors.
Figure 4A:
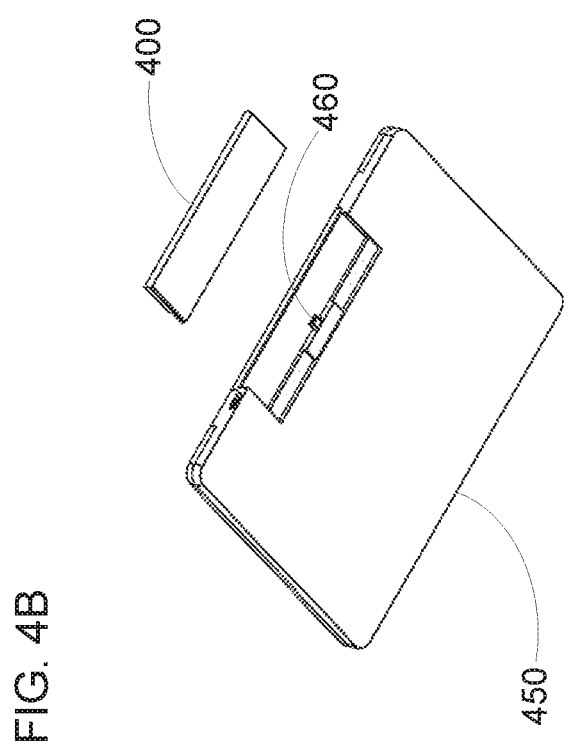
FIGS. 4A-D are perspective views of an example display unit mateable with a computing device.
Figure 4B:
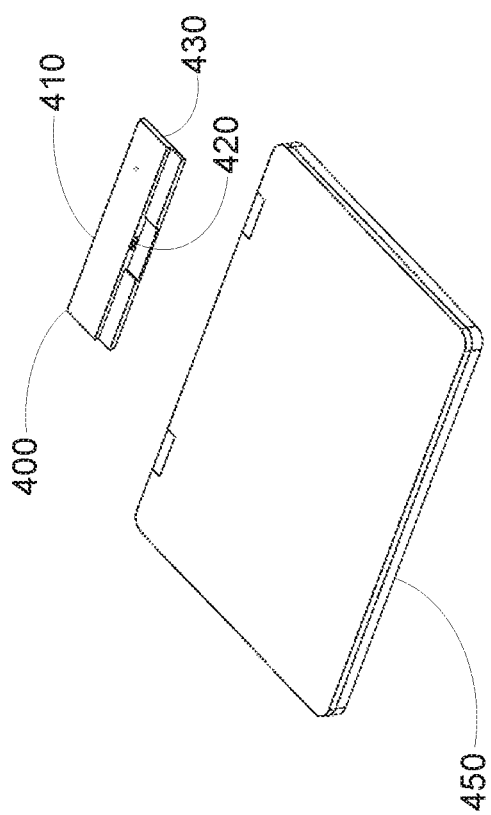
Figure 4C:
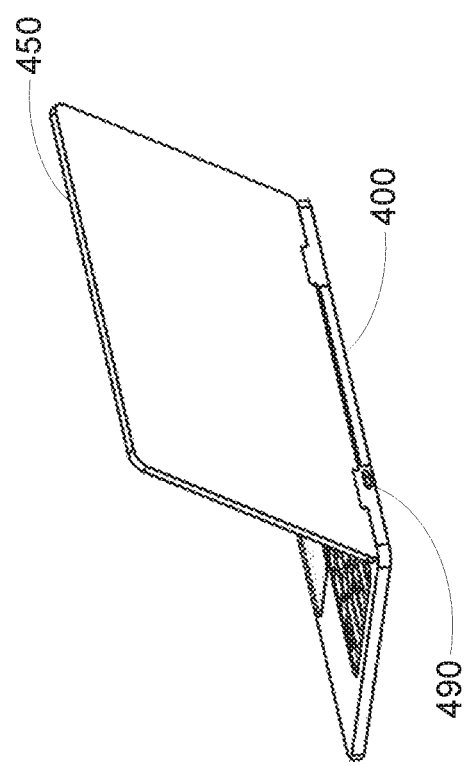
Figure 4D:
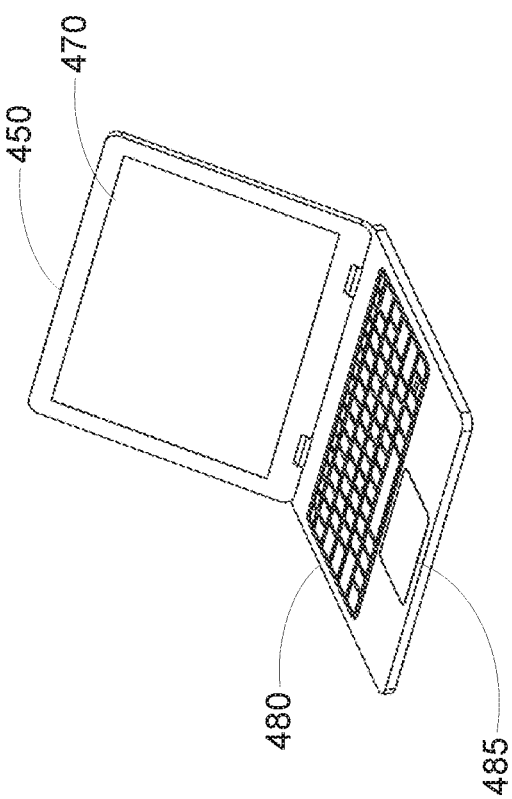

FIG. 3 is a perspective view of still another example computing device 300 to couple with various form factors. The computing device 300 may include a housing 310. The housing 310 may enclose the components of the computing device 300. The computing device 300 may also include a connector 320. The connector 320 may transfer power and data to or from the computing device. The computing device 300 may include a guide rail 330. The guide rail 330 may restrict movement in a particular dimension to assist a user in aligning the computing device 300 with a display unit with which the computing device 300 is being mated.

FIGS. 4A-D are perspective views of an example display unit 450 mateable with a computing device 400. In the illustrated example, the display unit 450 is a notebook display unit. Accordingly, the display unit 450 includes a display 470 in an upper housing to present an image to a user and a keyboard 480 and touchpad 485 in a lower housing to receive user input. Alternatively, or in addition, the display unit 450 may include a touch screen in the lower housing, and the touch screen may provide a virtual keyboard, a virtual touchpad, or the like. In some examples, the computing device 400 may output a landscape orientation image to the display unit 450 without regard to orientation sensors. The resolution may be determined based on the capabilities of the display 470. The display unit 450 may include a heat removal device (e.g., a fan, a heatsink, etc.) and a supplemental battery, so the computing device 400 may not need to reduce performance much due to available power or cooling capabilities. The display unit 450 may include limited sensors, so the computing device 400 may use its own internal sensors.

The computing device 400 may include a female connector 420 that mates with a male connector 460 in the display unit 450 without the use of an external cable. The computing device 400 may include a guide rail 430 to assist a user in aligning the connectors 420, 460. For example, the user may slide the computing device 400 towards the display unit 450. The guide rail 430, once inserted into the display unit 450, may prevent the computing device 400 from moving down away from the display unit 450 while the user continues sliding the computing device 400 until the connectors 420, 460 mate.

The computing device 400 may include a housing 410. The housing 410 may be substantially flush with the display unit 450 when the connectors 420, 460 are mated. For example, the bottom of the display unit 450 and the bottom of the housing 410 may be approximately even when the connectors 420, 460 are mated. Similarly, the back of the display unit 450 and the back of the housing 410 may be approximately even when the connectors 420, 460 are mated. Thus, the housing 410 and the display unit 450 may be substantially flush with each other along two orthogonal surfaces (e.g., two surfaces with orthogonal normal vectors). In other examples, surfaces other than the back or bottom may be substantially flush with each other. Because the surfaces are substantially flush, the computing device 400 is unlikely to be bumped and accidentally dislodged from the display unit 450. As used herein, the terms "substantially" and "approximately" refer to values that are within a manufacturing tolerance of each other.

The display unit 450 may include a locking mechanism 490 (e.g., a latch, a hook, a bar, etc.). The locking mechanism 490 may retain the computing device 400 within the display unit 450 so that a user cannot unmate the connectors 420, 460 and remove the computing device 400 without disengaging the locking mechanism 490. For example, the user may slide the locking mechanism 490 laterally to disengage the locking mechanism 490 from the computing device 400. The locking mechanism may also, or instead, be electrically triggered and controlled by software, and no manual switch may be needed. The housing 410 of the computing device 400 may receive the locking mechanism 490 to prevent movement of the computing device 400 when the locking mechanism 490 is engaged. For example, the housing 410 may include a recess or indent to receive the locking mechanism 490, may be sized or shaped to engage the locking mechanism 490, or the like.

Figure 5A:
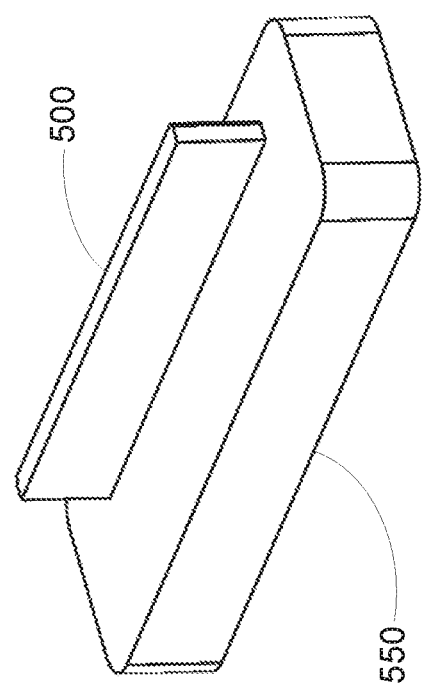
FIGS. 5A-5B are perspective views of an example docking station mateable with a computing device.
Figure 5B:
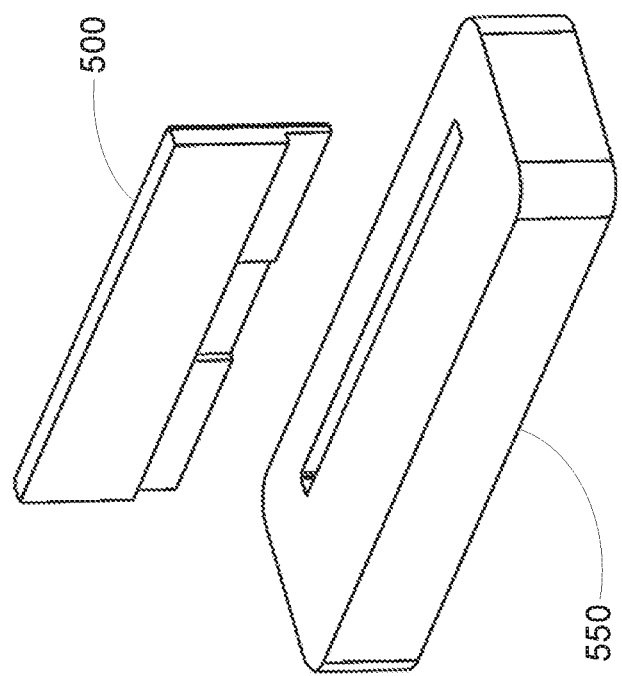

FIGS. 5A-5B are perspective views of an example docking station 550 mateable with a computing device 500. The docking station 550 may be communicatively coupled to a display unit, such as a display unit including a desktop, a workstation, a monitor, or the like. The docking station 550 may allow the computing device 500 to provide processing capabilities to the communicatively coupled display unit, which may or may not include additional processing capabilities. The computing device 500 may determine the form factor of the display unit and adjust configuration of the computing device 500 based on the determined form factor. For example, the computing device 500 may adjust the resolution or orientation of an image to be displayed on the communicatively coupled display unit. In some examples, the docking station 550 may provide wall power to the computing device 500 and may expose the computing device 500 to open air flow. Accordingly, the computing device 500 may not need to reduce performance much due to available power or cooling capabilities.

Figure 6:
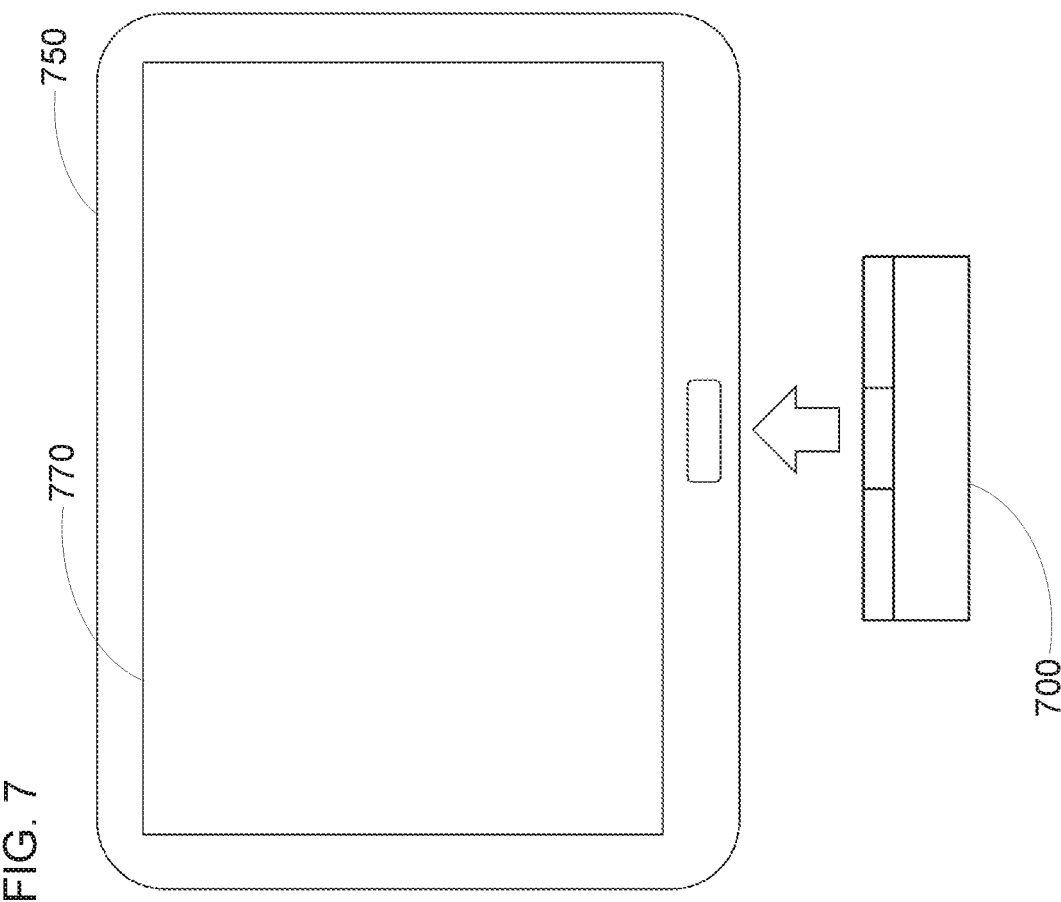
FIG. 6 is a plan view of another example display unit mateable with a computing device.

FIG. 6 is a plan view of another example display unit 650 mateable with a computing device 600. In the illustrated example, the display unit 650 is a phone display unit. Users may use the display unit 650 in various orientations, so the computing device 600 may determine the orientation of output images based on an orientation sensor in the computing device 600 or the display unit 650. The computing device 600 may determine the resolution based on the capabilities of a screen 670. The display unit 650 may include a supplemental battery, but the capacity may be limited by the size of the display unit 650. Cooling capabilities may also be limited by the size of the display unit. Accordingly, the computing device 600 may reduce processor performance significantly due to the limited power available and limited cooling capabilities. In some examples, the display unit 650 may include a number of sensors, a cellular transceiver, or the like, so the computing device 600 may use the sensors, cellular transceiver, etc. of the display unit 650.

Figure 7:
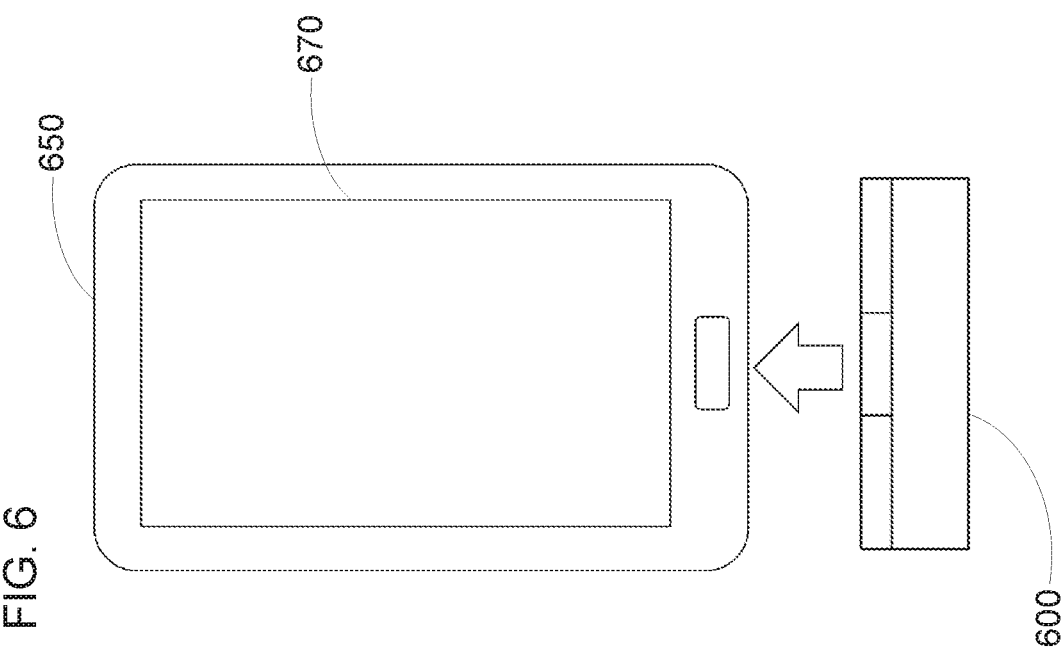
FIG. 7 is a plan view of still another example display unit mateable with a computing device.

FIG. 7 is a plan view of still another example display unit 750 mateable with a computing device 700. In the illustrated example, the display unit 750 is a tablet display unit. Users may use the display unit 750 in various orientations, so the computing device 700 may determine the orientation of output images based on an orientation sensor in the display unit 750 or the computing device 700. The computing device 700 may determine the resolution based on the capabilities of a screen 770. In some examples, the display unit 750 may include a supplemental battery with more capacity than that of the phone display unit 650 but less than that of the notebook display unit 450. Similarly, the cooling capabilities of the display unit 750 may be better than those of the phone display unit 650 but worse than those of the notebook display unit 450. Accordingly, the computing device 700 may reduce processor performance by an intermediate amount due to the available power and cooling capabilities. The display unit 750 may include a number of sensors, a cellular transceiver, or the like, so the computing device 700 may use the sensors, cellular transceiver, etc. of the display unit 750.

Figure 8:
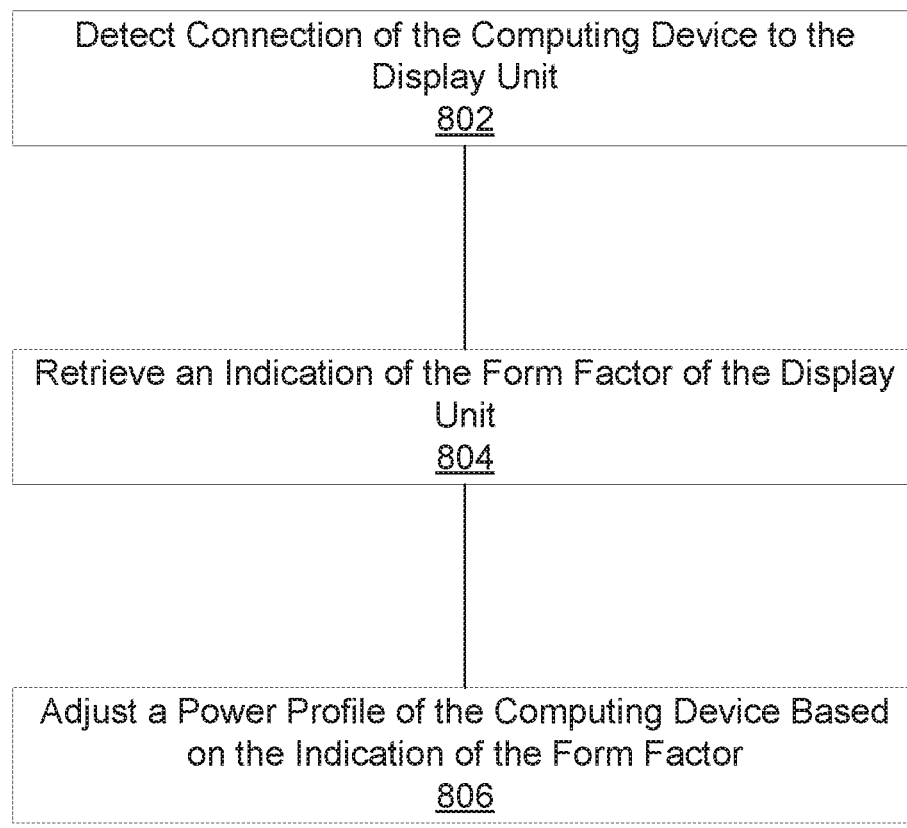
FIG. 8 is a flow diagram of an example method to configure a computing device based on a form factor of a display unit.

FIG. 8 is a flow diagram of an example method 800 to configure a computing device based on a form factor of a display unit. A processor may perform the method 800. In an example, the computing device may include the processor. At block 802, the method 800 may include detecting a connection of the computing device to the display unit. Detecting the connection may include detecting the electrical contact between the connectors of the computing device and the display unit. In some examples, the connection may transfer power from the display unit to the computing device. The connection may also transfer a display signal from the computing device to the display unit.

Block 804 may include retrieving an indication of a form factor of the display unit. Retrieving the indication of the form factor may include transmitting a request for the indication of the form factor and receiving the indication of the form factor as a response. Alternatively, retrieving the indication of the form factor may include receiving the indication of the form factor without transmitting a request. For example, the indication of the form factor may be received during or after completion of a handshake without including an explicit request for the indication of the form factor in the handshake.

Block 806 may include adjusting a power profile of the processor based on the indication of the form factor. Adjusting the power profile may include adjusting an amount of power used by the processor (e.g., a maximum power, a median power, an average power, etc.), adjusting a thermal envelope of the processor (e.g., a maximum amount of heat generated, a median amount of heat, an average amount of heat, etc.), or the like. The indication of the form factor may include an indication of the power profile to use. Alternatively, or in addition, adjusting the power profile may include determining which power profile to use based on the indication of the form factor. Referring to FIG. 1, the connector 110 or the processor 130, for example, may detect the connection and retrieve the indication of the form factor, and the processor 130, for example, may adjust the power profile of the processor 130.

Figure 9:
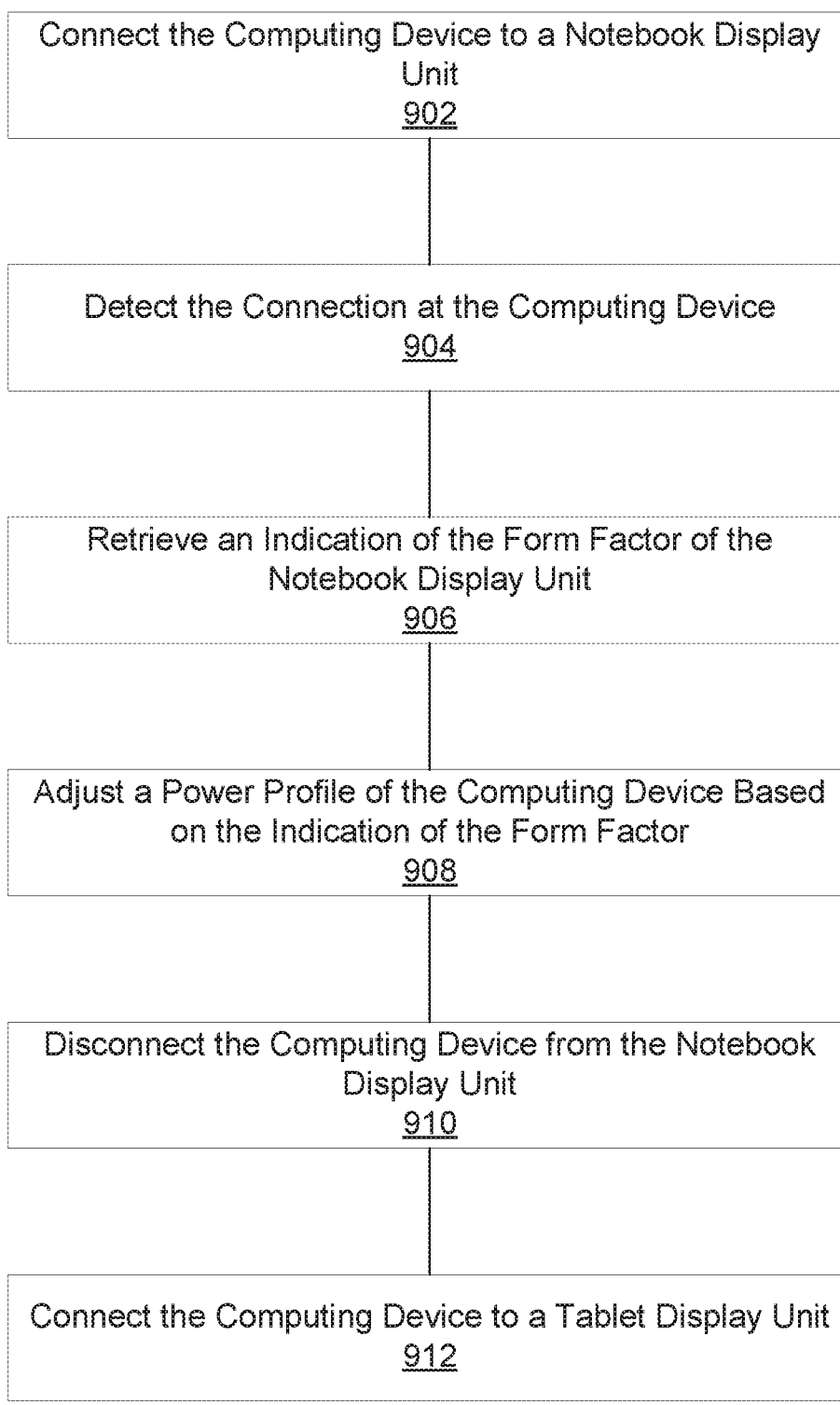
FIG. 9 is a flow diagram of another example method to configure a computing device based on a form factor of a display unit.

FIG. 9 is a flow diagram of another example method 900 to configure a computing device based on a form factor of a display unit. A processor may perform the method 900. In an example, the computing device may include the processor. At block 902, the method 900 may include connecting the computing device to a display unit, such as a notebook display unit. The display unit may include an upper housing that includes a display. The display unit may also include a lower housing coupled to the upper housing by a hinge. The lower housing may include a keyboard, a touchpad, or the like. In some examples, the display unit may include a battery supplemental to any batteries in the computing device and a heat removal device, such as a fan, a heatsink, or the like.

Connecting the computing device to the display unit may include mating a computing device connector with a display unit connector. In some examples, connecting the computing device to the display unit may include doing so without using a cable to mate the connectors. Connecting the computing device to the display unit may include engaging a locking mechanism to prevent accidental disconnecting. The locking mechanism may include a spring to engage the locking mechanism automatically when connecting. In an example, connecting the computing device to the display unit may include connecting the computing device to the lower housing until the computing device is substantially flush with two substantially orthogonal surfaces of the display unit.

Block 904 may include detecting a connection at the computing device. Detecting the connection may include detecting the electrical contact between the connectors of the computing device and the display unit. For example, detecting the connection may include detecting sourcing or sinking of power on power pins, detecting a data signal on data pins, or the like. The connection may transfer power from the display unit to the computing device. In some examples, the connection, at times, may be used to transfer power to the display unit from the computing device. The connection may transfer a display signal from the computing device to the display unit. The connection may transfer additional data between the display unit and the computing device. For example, input at an input interface (e.g., keyboard, mouse, trackpad, touchscreen, etc.) may be transmitted from the display unit to the computing device. Data to and from ports, network interfaces, sensors, or the like in the display unit also may be transferred over the connection.

At block 906, the method 900 may include retrieving an indication of the form factor of the display unit. In an example, retrieving the indication of the form factor may include retrieving an identifier for the display unit. Retrieving the indication may include accessing a mapping relating the identifier to information about the form factor. Alternatively, or in addition, retrieving the indication of the form factor may include retrieving information about the form factor. The information about the form factor may include information about a display, such as a number of pixels in the display, an aspect ratio of the display, a refresh rate of the display, an orientation of the display, a rotatability of the display, or the like. The information about the form factor may include information about power or thermal capabilities, such as a power source, a battery capacity, a battery charge, a cooling capability, a thermal envelope, a power profile to be used by processors, or the like. The information about the form factor may include information about sensors, ports, network interfaces, or LEDs, such as number, type, speed, or version of sensors, ports, network interfaces, or LEDs; accuracy or precision of sensors, power consumption of sensors, or the like.

At block 908, the method 900 may include adjusting a power profile of the computing device based on the indication of the form factor. Adjusting the power profile may include adjusting the power profile to provide a particular power usage of the processor, to provide a particular amount of heat generated, or the like. Adjusting the power profile may include adjusting a processor speed, adjusting a number of cores used, or the like. In addition, the method 900 may include adjusting a resolution or orientation of images output to the display unit based on the indication of the form factor. The method 900 may also include selecting whether to use sensors, ports, network interfaces, LEDs, etc. from the computing device or the display unit.

Block 910 may include disconnecting the computing device from the display unit. For example, disconnecting the computing device may include disengaging the locking mechanism and unmating the computing device connector from the display unit connector. At block 912, the method 900 may include connecting the computing device to another display unit, such as a tablet display unit. Connecting the computing device to the other display unit may include mating the computing device connector to a connector of the other display unit. In some examples, the other display unit may include a locking mechanism to engage the computing device and prevent the computing device from becoming dislodged. The computing device may be substantially flush with a surface of the other display unit while connected with the other display unit. For example, a surface of the computing device may be substantially flush with a corresponding surface of the other display unit. In some examples, a plurality of surfaces of the computing device may be substantially flush with a corresponding plurality of surfaces of the other display unit. In an example, a user may perform blocks 902, 910, and 912 using the connector 210 of FIG. 2; the connector 210 or the processor 230 of FIG. 2 may perform blocks 904 and 906; and the processor 230 may perform block 908.

Figure 10:
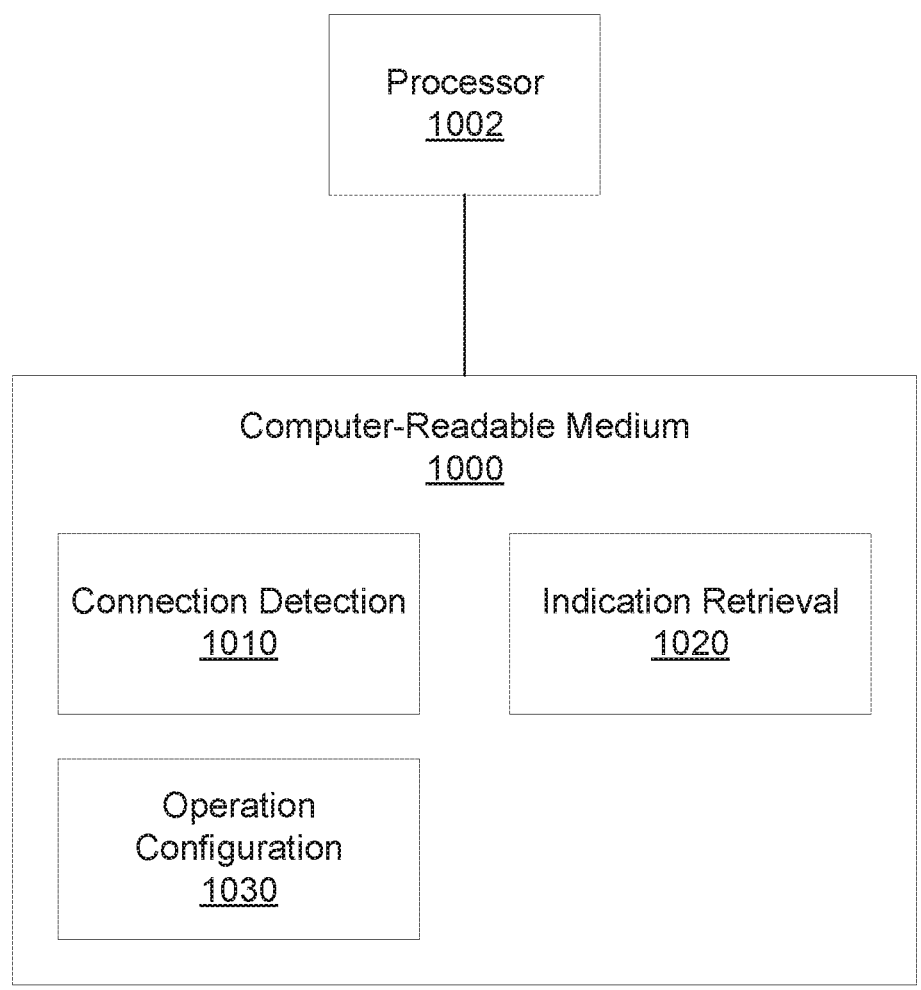
FIG. 10 is a block diagram of an example computer-readable medium including instructions that cause a processor to configure a computing device based on a form factor of a remote device.

FIG. 10 is a block diagram of an example computer-readable medium 1000 including instructions that, when executed by a processor 1002, cause the processor 1002 to configure a computing device based on a form factor of a remote device. The computer-readable medium 1000 may include a connection detection module 1010. As used herein, a "module" (in some examples referred to as a "software module") is a set of instructions that when executed or interpreted by a processor or stored at a processor-readable medium realizes a component or performs a method. The connection detection module 1010 may include instructions that cause the processor 1002 to detect a connection to a remote device that provides power to a local device. For example, the connection detection module 1010 may cause the processor 1002 to detect electrical contact of a local device connector with a remote device connector.

The computer-readable medium 1000 may also include an indication retrieval module 1020. The indication retrieval module 1020 may cause the processor 1002 to retrieve an indication of the form factor of the remote device. For example, the indication retrieval module 1020 may cause the processor 1002 to request and receive the indication of the form factor, to receive the indication of the form factor without request (e.g., during or after a handshake), or the like. The indication retrieval module 1020 may cause the processor 1002 to receive the indication of the form factor from the remote device via the local device connector. The indication of the form factor may include information about user interfaces of the remote device (e.g., types of user interfaces, capabilities of the user interfaces, etc.), power profile information (e.g., available power, cooling capabilities, etc.), information about peripheral components (e.g., types and capabilities of ports, network interfaces, sensors, LEDs, etc.), or the like.

The computer-readable medium 1000 may include an operation configuration module 1030. The operation configuration module 1030 may cause the processor 1002 to configure operation of the local device based on the indication of the form factor. For example, the operation configuration module 1030 may cause the processor 1002 to configure the data sent to or received from the user interfaces based on the information about the user interfaces of the remote device. The operation configuration module 1030 may also, or instead, cause the processor 1002 to configure processor operation based on the power profile information. Alternatively, or in addition, the operation configuration module 1030 may cause the processor 1002 to select which peripheral components to use based on the information about the peripheral components of the remote device. Referring to FIG. 1, the connection detection module 1010, the indication retrieval module 1020, or the operation configuration module 1030, when executed by the processor 1002, may realize the connector 110 or the processor 130, for example.

Figure 11:
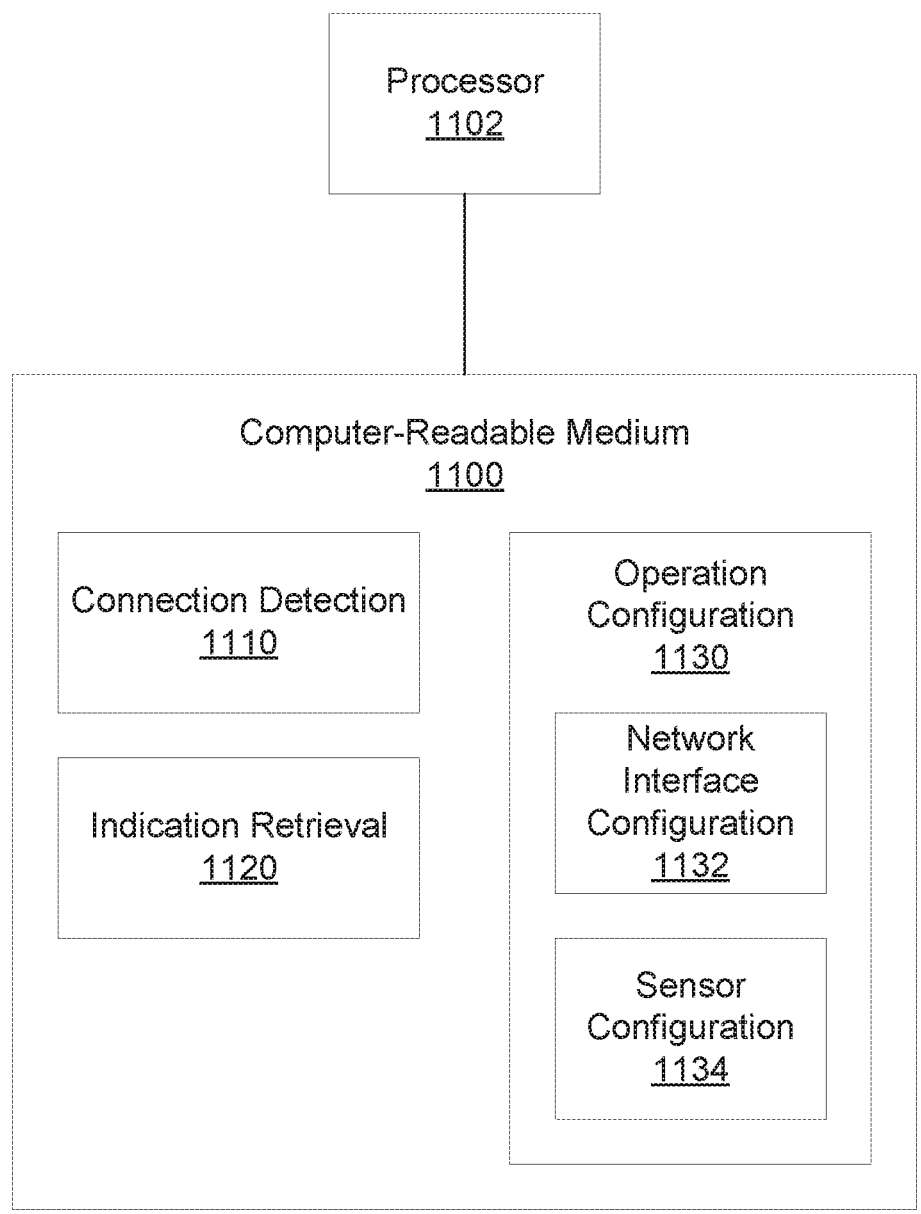
FIG. 11 is a block diagram of another example computer-readable medium including instructions that cause a processor to configure a computing device based on a form factor of a remote device.

FIG. 11 is a block diagram of another example computer-readable medium 1100 including instructions that, when executed by a processor 1102, cause the processor 1102 to configure a computing device based on a form factor of a remote device. The computer-readable medium 1100 may include a connection detection module 1110. The connection detection module 1110 may include instructions that cause the processor 1102 to detect a connection to a remote device that provides power to a local device. For example, the connection detection module 1110 may cause the processor 1102 to detect when a source or sink is coupled to power pins of a local device connector, when a data signal is transmitted to data pins of the local device connector, or the like. The connection detection module 1110 may cause the processor 1102 to cause the local device connector to receive power from the remote device, to transmit a display signal to the remote device, to exchange data with the remote device, or the like.

The computer-readable medium 1100 may include an indication retrieval module 1120. The indication retrieval module 1120 may cause the processor 1102 to retrieve an indication of the form factor of the remote device. In an example, the indication of the form factor may include information about the form factor. Alternatively, or in addition, the indication of the form factor may include an identifier for the form factor, and the indication retrieval module 1120 may cause the processor 1102 to retrieve the information about the form factor from a locally or remotely stored mapping between identifiers of form factors and information about the form factors. The information about the form factor may include information about user interfaces of the remote device, power profile information about the remote device, information about peripheral components of the remote device, or the like.

The computer-readable medium 1100 may include an operation configuration module 1130. The operation configuration module 1130 may cause the processor 1102 to configure operation of the local device based on the information about the form factors. For example, the information about the form factors may include information about a display of the remote device. The operation configuration module 1130 may cause the processor 1102 to select an aspect ratio, number of pixels, orientation, etc. of images output from the local device to the remote device. The operation configuration module 1130 may cause the processor 1102 to configure the local device to receive input from input user interfaces of the remote device. The operation configuration module 1130 also may cause the processor 1102 to configure the local device to comply with power availability, cooling capabilities, etc. of the remote device, for example, by adjusting processor performance of the local device. The operation configuration module 1130 may cause the processor 1102 to decide whether to use local device status LEDs or remote device status LEDs.

The operation configuration module 1130 may include a port and network interface configuration module 1132. The information about the peripheral components of the remote device may include information about a port in the remote device and information about a network interface in the remote device. The port and network interface configuration module 1132 may cause the processor 1102 to select between the network interface in the remote device and a network interface in the local device. For example, the port and network interface configuration module 1132 may cause the processor 1102 to select the network interface to use based on the type or protocol of each network interface, a data rate of each network interface, a power consumption of each network interface, or the like. The port and network interface configuration module 1132 may cause the processor 1102 to select which ports of the remote device to use. The port and network interface configuration module 1132 may cause the processor 1102 to select all available ports, as many ports as can be supported, the most likely ports to be used, or the like. The port and network interface configuration module 1132 may cause the processor 1102 to configure the local device to communicate using the network interface in the remote device, the ports of the remote device, or the like.

The operation configuration module 1130 may include a sensor configuration module 1134. The information about the peripheral components of the remote device may include information about a sensor in the remote device. The sensor configuration module 1134 may cause the processor 1102 to determine whether to use the sensor in the remote device or a sensor in the local device to perform a predetermined operation. The sensor configuration module 1134 may cause the processor 1102 to determine which sensor to use based on the type or capabilities of each sensor, the precision or accuracy of each sensor, the power consumption of each sensor, or the like. In some examples, the sensor configuration module 1134 may cause the processor 1102 to determine that both sensors can be used to improve overall performance. The sensor configuration module 1134 may cause the processor 1102 to decide to use both sensors. The sensor configuration module 1134 may cause the processor 1102 to configure the local device to receive measurements from the sensor in the remote device.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:
1. A computing device, comprising:
    a connector to mate with a display unit, the connector to receive power from the display unit and output a display signal to the display unit;
    a non-transitory computer readable medium; and
    a processor communicatively coupled to the non-transitory computer readable medium, the processor to:
        determine a form factor of the display unit, including a display size associated with the display unit, and
        adjust a processor speed based on the form factor and the display size.

2. The computing device of claim 1, further comprising a battery, wherein the processor is to detect disconnection from the display unit, and enter a low power state based on the disconnection.

3. The computing device of claim 1, further comprising a housing, wherein the housing is to engage a locking mechanism when connected to the display unit, and wherein the housing is substantially flush with the display unit when connected.

4. The computing device of claim 1, further comprising an orientation sensor to measure an orientation of the computing device, wherein the processor is to adjust the orientation of the image based on the form factor and the orientation of the computing device.

5. A method, comprising:
   detecting, using a processor, a connection of a computing device comprising the processor to a display unit, wherein the connection transfers power from the display unit to the computing device and a display signal from the computing device to the display unit;
   retrieving, using the processor, an indication of a form factor of the display unit including a display size associated with the display unit; and
   adjusting, using the processor, a power profile of the processor based on the indication of the form factor and the display size.

6. The method of claim 5, further comprising connecting the computing device to the display unit, wherein the display unit comprises an upper housing including a display and a lower housing coupled to the upper housing by a hinge, the lower housing comprising a keyboard.

7. The method of claim 6, wherein connecting the computing device to the display unit comprises connecting the computing device with the lower housing, and wherein the computing device is substantially flush with two substantially orthogonal surfaces of the display unit.

8. The method of claim 7, further comprising disconnecting the computing device from the display unit and connecting the computing device to a tablet display unit, wherein the computing device is substantially flush with a surface of the tablet display unit.

9. The method of claim 6, wherein connecting the computing device to the display unit comprises connecting the computing device to a display unit comprising a supplemental battery and a heat removal device.

10. A non-transitory computer-readable medium comprising instructions that, when executed by a processor, cause the processor to:
    detect a connection to a remote device that provides power to a local device;
    retrieve an indication of a form factor of the remote device, wherein the indication of the form factor includes information about user interfaces, power profile information, information about peripheral components of the remote device, and a display size of a display unit; and
    configuring operation of the local device based on the indication of the form factor, including configuring operation of the processor or another processor based on the display size.

11. The computer-readable medium of claim 10, wherein the information about the peripheral components includes information about a port and a network interface in the remote device.

12. The computer-readable medium of claim 11, wherein the instructions cause the processor to configure the operation of the local device by selecting between the network interface in the remote device and a network interface in the local device based on a data rate of each network interface.

13. The computer-readable medium of claim 10, wherein the information about the peripheral components includes information about a sensor in the remote device.

14. The computer-readable medium of claim 13, wherein the instructions cause the processor to configure the operation of the local device by determining whether to use the sensor in the remote device or a sensor in the local device to perform a predetermined operation.

\* \* \* \* \*